United States Patent
Laurent

(10) Patent No.: US 8,672,636 B2
(45) Date of Patent: Mar. 18, 2014

(54) METHOD FOR MANUFACTURING BRAIDED PREFORMS

(75) Inventor: Philippe Laurent, Fleron (BE)

(73) Assignee: Techspace Aero S.A., Milmort (BE)

( * ) Notice: Subject to any disclaimer, the term of this patent is extended or adjusted under 35 U.S.C. 154(b) by 893 days.

(21) Appl. No.: 12/816,507

(22) Filed: Jun. 16, 2010

(65) Prior Publication Data

US 2010/0322776 A1 Dec. 23, 2010

(30) Foreign Application Priority Data

Jun. 17, 2009 (EP) .................................. 09162977

(51) Int. Cl.
*F01D 5/14* (2006.01)
(52) U.S. Cl.
USPC ........................................................ 416/230
(58) Field of Classification Search
USPC ...... 416/223 R, 224, 229 R, 230, 232, 241 R, 416/241 A; 29/889.2, 889.7, 889.72
See application file for complete search history.

(56) References Cited

U.S. PATENT DOCUMENTS

| | | | | |
|---|---|---|---|---|
| 4,741,087 A | * | 5/1988 | Plummer, Jr. ..................... | 29/446 |
| 5,018,271 A | * | 5/1991 | Bailey et al. ................ | 29/889.71 |
| 5,308,228 A | * | 5/1994 | Benoit et al. ................... | 416/230 |
| 5,549,947 A | * | 8/1996 | Quigley et al. ............... | 428/36.2 |
| 5,623,888 A | * | 4/1997 | Zafiroglu ...................... | 112/414 |
| 7,147,895 B2 | * | 12/2006 | Cundiff et al. ................ | 427/289 |
| 2002/0008177 A1 | | 1/2002 | Violette | |
| 2005/0042109 A1 | * | 2/2005 | Kovalsky et al. ............. | 416/230 |

FOREIGN PATENT DOCUMENTS

CA 1004986 2/1977

OTHER PUBLICATIONS

Garrett C. Sharpless, "Triaxial Braiding . . . ", Composites Manufacturing magazine, Oct. 2005, 4 pages, downloaded at: http://www.fiberinnovations.com/PDFs/Triaxial%20Braiding.pdf on Sep. 15, 2010.
Stephan Voskamp, Advances in overbraiding for composite part manufacturing, 3rd International Symposium on Composites Manufacturing Technology for Aircraft Structures, May 17-18, 2006, 1 page, Marknesse, The Netherlands.

* cited by examiner

*Primary Examiner* — Richard Edgar
(74) *Attorney, Agent, or Firm* — Reinhart Boerner Van Deuren P.C.

(57) ABSTRACT

The present invention relates to an automatic method for manufacturing a stator or rotor blade preform for a turbine engine, comprising at least the following successive steps:
a) a step for the helical braiding of a plurality of interlocked tubular braids (1), called nested braids, said step being conducted on braiding machines (2) placed in a row in a braiding direction;
b) a step for flattening the nested braids (1);
c) a step for stitching the nested braids (1) together in a direction perpendicular to the braiding direction;
d) a step for winding the nested braids (1) on a transport mandrel (3);
e) a step for cutting the nested braids (1) unwound from the transport mandrel (3), said cut being performed in a direction perpendicular to the braiding direction.

15 Claims, 4 Drawing Sheets

Figure 1:
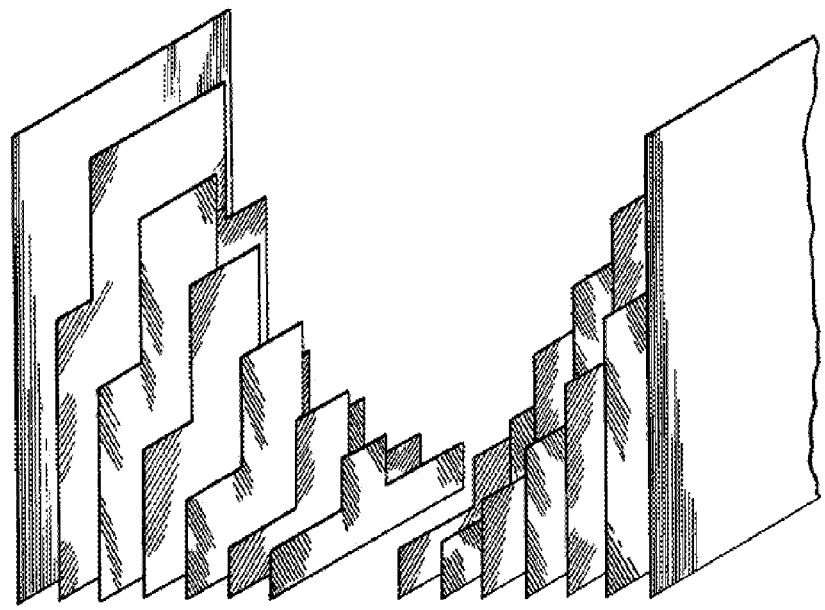

Tubular braids
Step a)

Flattened braids
Step b)

RTM

Tubular braids
Step a)

Flattened braids
Step b)

RTM

METHOD FOR MANUFACTURING BRAIDED PREFORMS

CROSS-REFERENCE TO RELATED APPLICATIONS

This patent application claims the benefit of European Application No. 09162977.4, filed Jun. 17, 2009, the entire teachings and disclosure of which are incorporated herein by reference thereto.

FIELD OF THE INVENTION

The present invention relates to an automatic method for manufacturing braided preforms for stator and rotor blades in the aeronautics.

It also relates to the blade obtained using the method.

STATE OF THE ART

In aeronautic engines, it is known that the majority of blades are currently made of titanium. The replacement of titanium by an organic matrix composite material (OMC) would allow a major weight gain. Therefore, assuming that the geometry of the blade—which is mainly determined on the basis of aeronautic considerations—is not changed, the relative weight gain between a titanium blade and an OMC blade is expressed in the density ratio that equals ~3, which explains the interest for OMC blades.

In a context of mass production, it is important to design a manufacturing method leading to low unit cost and high repeatability of the parts. Additionally, the blade must meet the different criteria's of the specifications, namely weight criteria (for example a weight reduction of 20% of the assembled guide vane in the case of stator blades), aerodynamics (profile, thickness of leading edge and of trailing edge, surface condition), and criteria's relating to mechanical resistance (stiffness and mechanical strength) and resistance to corrosion.

One solution proposed to date consists in producing the blade by draping folds. Draping consists in constructively creating a part by the addition of material by superimposing successive layers on tooling. Patent CA 1,004,986 shows an example manufacturing of blades by superimposing fourteen folds of variable dimensions (see FIG. 1).

This solution suffers from several drawbacks:
Cutting folds of small size is difficult and the dry fibre reinforcement is highly liable to disintegration when being handled,
The joins between the folds, more particularly at the leading edge of the blade, are subjected to stress concentrations.
There is a risk of delamination between the folds.
Draping is a costly solution since it is highly labour intensive; it also suffers from a lack of repeatability.

In the prior art (Voskamp et al, <<*Advances in overbraiding for composite part manufacturing*>> Eurocarbon B.V., Advanced braiding and weaving technology, 37th ISTC—Seattle, Wash.—Oct. 31-Nov. 3, 2005), it is also proposed to obtain preforms of composite parts (e.g. for automobile applications) by overbraiding. This technique consists in achieving the preform by braiding around a core of variable section. Successive layers may be braided on top of one another, depending on the desired thickness, as the core successively passes through the braiding machine. Then, either the core remains in the end product obtained after resin injection, or it is removed.

AIMS OF THE INVENTION

The present invention aims to provide a solution that allows to overcome the drawbacks of the prior art.

The present invention more particularly aims to provide an automatic method for producing blade preforms in order to meet the volume of demand and to increase repeatability.

The present invention also aims to provide a method allowing to produce preforms with better mechanical properties than those obtained by draping folds.

The present invention also aims to provide a method overcoming the need to use a core for the manufacture.

MAIN CHARACTERISTIC ELEMENTS OF THE INVENTION

The present invention relates to an automatic method for manufacturing a preform for a turbine engine stator or rotor blade, comprising at least the following successive steps:
a) a step for the helical braiding of a plurality of interlocked tubular braids, also called nested braids, said step being conducted on braiding machines placed in a row in the braiding direction;
b) a step for flattening the nested braids;
c) a step for stitching the nested braids together in a direction perpendicular to the braiding direction;
d) a step for winding the nested braids on a transport mandrel;
e) a step for cutting the nested braids unwound from the transport mandrel, said cut being performed in a direction perpendicular to the braiding direction.

According to particular embodiments of the invention, the method comprises at least one or a suitable combination of the following features:
at step a), yarns at 0°, i.e. parallel to the braiding direction, are inserted on at least a portion of the perimeter of one or several tubular braids during the manufacture of the braid (s); the non-homogeneous distribution of yarns at 0° over the perimeter of the braid(s) allows to produce blade preforms of variable thickness chordwise;
at step a), at least one yarn at 0° or a strand at 0°, i.e. parallel to the braiding direction, is inserted between the tubular braids with a view to achieve blade preforms of variable thickness chordwise;
the inserted yarns or strands have different diameters;
the tubular braids are arranged non-concentrically at step a) in order to achieve blade preforms of variable thickness chordwise;
the circumferential braiding speed is adjusted during the manufacture of the tubular braids so as to periodically vary the thickness of the braids; the speed variation thereby allows to produce blade preforms with a small variation in thickness heightwise;
at least one of the tubular braids comprises yarns at 0° in elastomer material or heat-shrinkable material;
the yarn at 0° in elastomer material is pre-stressed at step a);
after winding step d), the tubular braids unwound from the mandrel are laid out and clamped at an additional step d'), and after cutting step e), the tubular braid(s) comprising elastomer yarns retract(s);
the yarns are pre-stressed with different tension levels in order to impart the desired geometry to the tubular braid(s);
if the yarns are heat-shrinkable, the method comprises an additional step f) for heating the nested braids in order to allow the retraction of the heat-shrinkable yarns, said step f) occurring after cutting step e);

the applied heating is not uniform and/or the heat-shrinkable yarns have different retraction coefficients so as to impart the desired geometry to the tubular braid(s);

after the preform is produced, there is an additional step for injecting resin in the preform using the RTM process (Resin Transfer Moulding).

The present invention also relates to a turbine engine stator or rotor blade obtained by means of the method such as described above; said blade possibly having a variable thickness chordwise and/or heightwise.

SHORT DESCRIPTION OF THE DRAWINGS

FIG. 1, already mentioned, shows the fold draping for a prior art blade.

Figure 2:
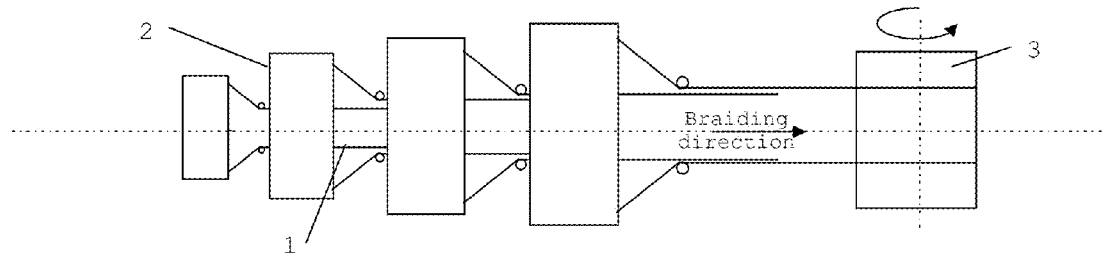

FIG. 2 schematically shows the manufacture of nested tubular braids as in the invention.

Figure 3:
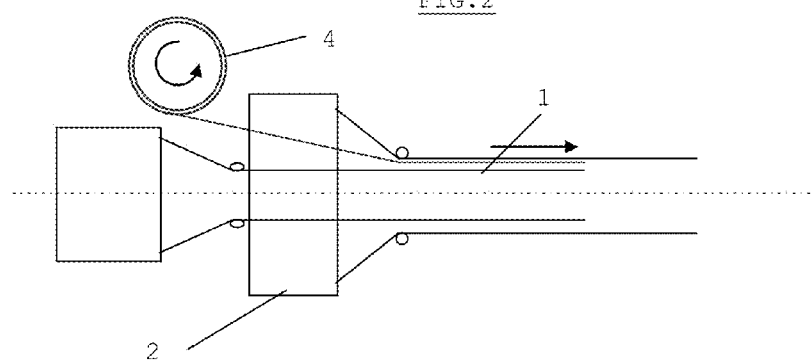

FIG. 3 schematically shows the unwinding of a yarn or strand between the tubular braids.

Figure 4:
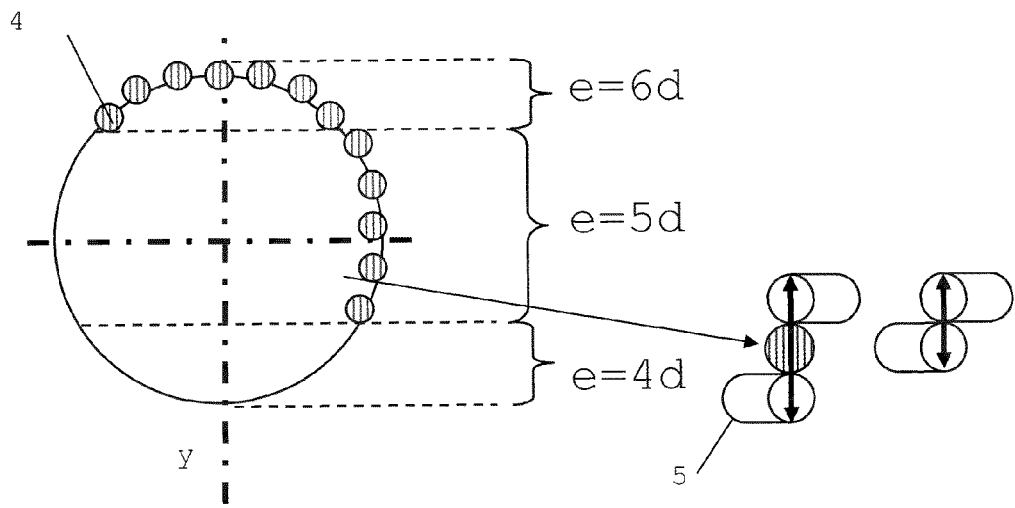

FIG. 4 schematically shows the insertion of yarns at 0° on a portion of the circumference of the braid to form a hybrid braid, i.e. both bi-axial and tri-axial.

Figure 5:
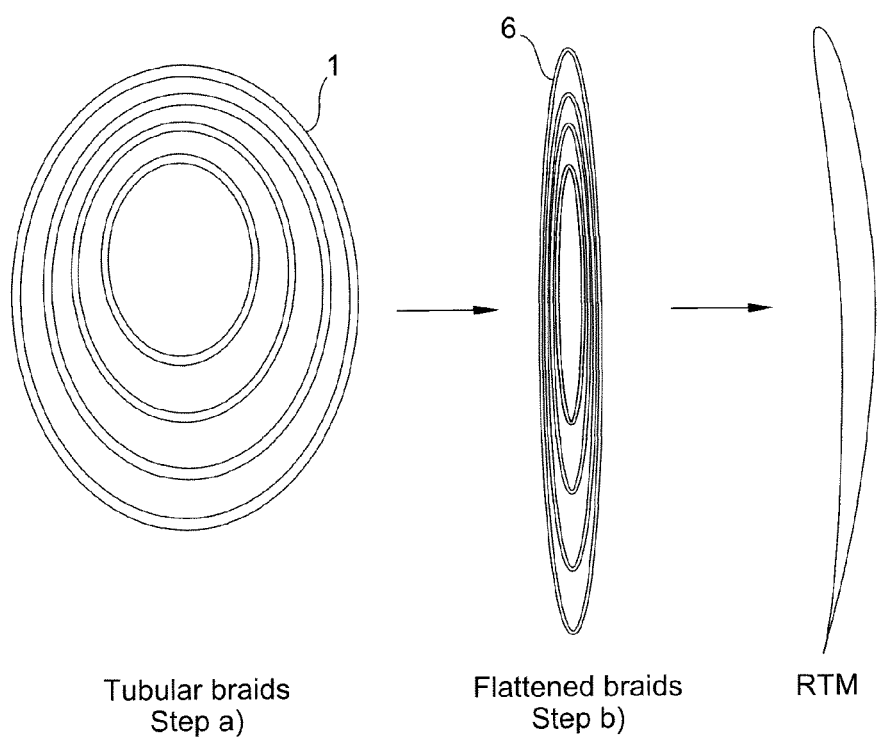

FIG. 5 schematically shows the non-concentric positioning of the tubular braids followed by the flattening step, and subsequently, after the stitching, winding and cutting steps (not shown), the RTM moulding step (Resin Transfer Moulding).

Figure 6:
Figure 6:

FIG. 6 schematically shows a cross-sectional view in the braiding direction of a braid of variable thickness obtained by modulating the circumferential braiding speed.

Figure 7:
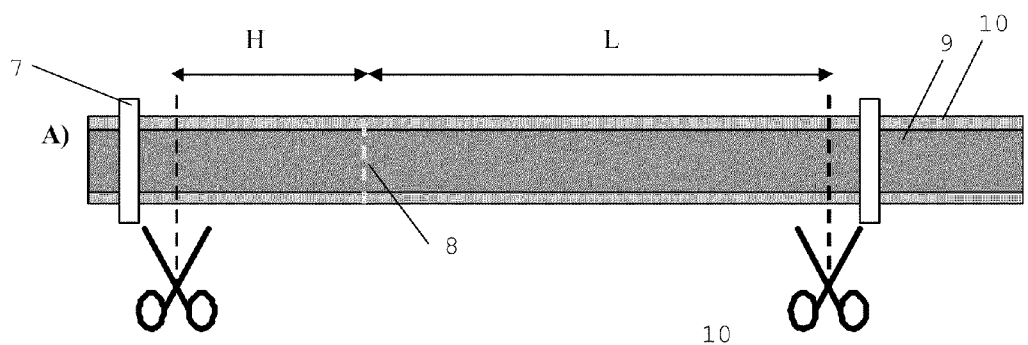
Figure 7:

FIG. 7 schematically shows under A) and B) a top view and top and profile views respectively of an example preform made of two tubular braids, one inner and the other outer, before and after cutting respectively, the inner braid comprising yarns at 0° in elastomer.

Figure 8:
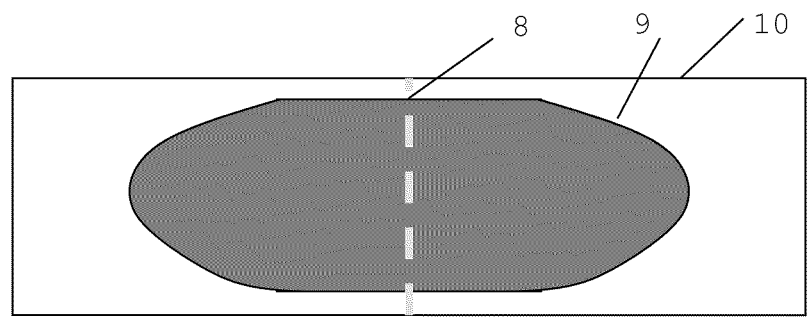

FIG. 8 schematically shows a top view of another example preform made of two tubular braids as in FIG. 7, the inner braid comprising yarns at 0° in elastomer.

Figure 9:
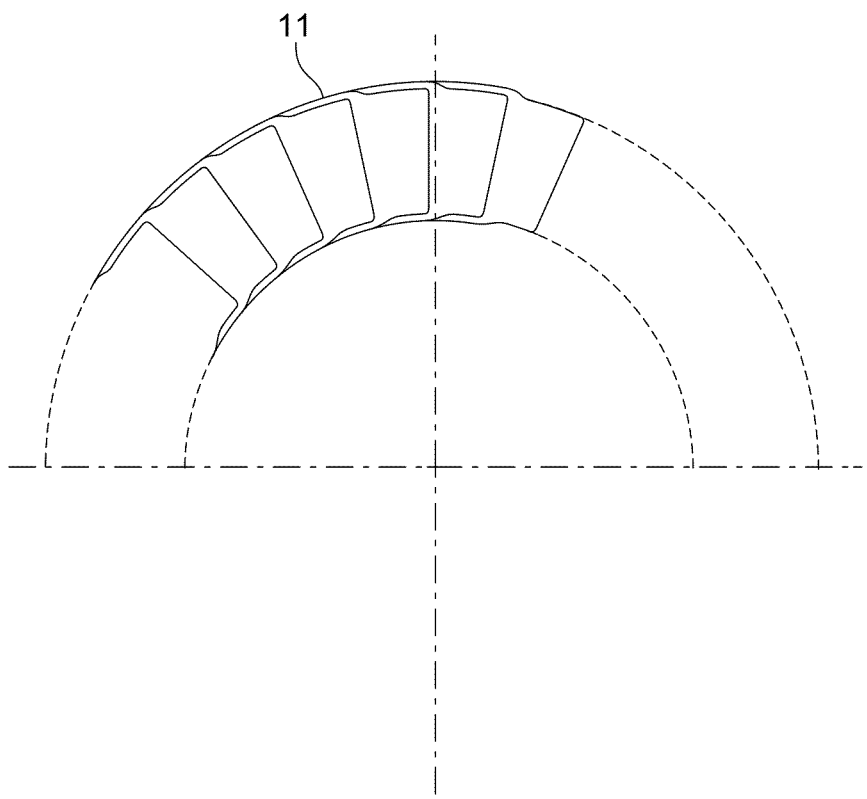

FIG. 9 shows a stator resulting from the interlocking of the lower platforms and upper platforms of the stator blades respectively.

KEY (1) Tubular braid
(2) Braiding machine
(3) Transport mandrel
(4) Yarn at 0°
(5) Orientated yarn, e.g. at +/−45° or at +/−60°
(6) Resin-rich zone
(7) Clamping system
(8) Stitching
(9) Inner tubular braid
(10) Outer tubular braid
(11) "C"-shaped stator blade

DETAILED DESCRIPTION OF THE INVENTION

The idea at the basis of the present invention is to produce preforms of stator or rotor blades from tubular braids interlocking into one another, also called nested braids. Unlike fold draping in which the fabric is cut into pieces, the method as in the invention allows to maintain the integrity of the tubular braids. By so doing, the stiffness and torsional strength are ensured by the continuity of the orientated yarns (helical positioning) and the risk of delamination is greatly reduced.

The method for manufacturing preforms as in the invention is automatic and comprises at least five steps.

A first step a) consists in manufacturing nested braids. A second step b) consists in flattening the nested braids. A third step c) consists in stitching the braids together. A fourth step d) consists in winding the braids on a mandrel. A fifth step e) consists in cutting the braids unwound from the mandrel. As specified below, variants of the method as in the invention also comprise additional steps.

Description of the Method as in the Invention

As an example, step a) is described for the manufacture of a blade preform made from four tubular braids, which corresponds to the superimposition of eight folds in the case of a draped preform.

With a view to mass manufacturing, the tubular braids 1 are produced by four braiding machines 2 arranged in a row in the braiding direction (see FIG. 2). In view of the required braid diameters, a diameter volume of about one meter can be expected per machine. The braids may be bi-axial, i.e. they comprise yarns orientated for example at +/−45° or +/−60°; they may also be tri-axial, i.e. they further comprise yarns orientated at 0°. They may also be hybrid as will be explained below.

In the present invention, the braiding of the different braids does not necessarily require the use of a core and the proper shaping of the blade preform is obtained by an inventive combination of different methods described below.

The straight cross-section of a blade taken at a given height has a variable thickness along the chord, which is the segment joining the leading edge to the trailing edge of a blade. This profile of incurved NACA-profiled type is dictated by aeronautics. Several methods may be used to achieve variable thickness along the chord. A combination of two or several methods leads to a very satisfactory result.

One first method consists in distributing yarns 4 at 0° non-homogeneously (i.e. parallel to the braiding direction):

Either by inserting a yarn 4 or strand (twisted yarn) between the different tubular braids 1 as shown in FIG. 3. If a strand of aramid (Kevlar®) is used, it may also act as debris shield in the event of impact.

Or by using a hybrid braid, both bi-axial and tri-axial, i.e. the yarns at 0° are directly inserted during the manufacture of the bi-axial braid (cf. manufacture of tri-axial braids). In this case, unlike triaxial braids, the yarns 4 at 0° are not uniformly distributed over the perimeter as illustrated in FIG. 4. The advantage of this method is that the yarns 4 at 0° are mechanically maintained by the orientated yarns 5, which imparts better resistance to the preform. After the tubular braid is flattened along axis y, there results a gradual variation in thickness of the flattened braid by a thickness equivalent to four times the diameter of the yarn up to a thickness equal to six times the diameter of the yarn. With the same perspective of hybrid braids, the inserted yarns at 0° may be of different diameter (e.g. 3 k=3000 filaments to form one yarn, 6 k=6000 filaments).

A second method consists in the non-concentric relative positioning of the different tubular braids 1 as illustrated in FIG. 5. This is obtained by off-centring the axes of the braiding machines placed in a row. Off-centring may be modulated during the manufacture by the controlled lateral displacement of the braiding machines. Non-concentric positioning of the different tubular braids aims to create a variation in thickness along the chord of the blade, once the braids have been flattened at step b) and before finalizing the part by RTM moulding (Resin Transfer Moulding). Therefore, for the actual blade, the braids are placed non-concentrically since the leading edge is thicker than the trailing edge, whilst for the platform of the blade, the braids are placed concentrically since its thickness is constant.

The combination of hybrid braids and non-concentric braids should lead to a satisfactory result. However, it appears advantageous to also insert a yarn 4 in Kevlar® at 0° in order to fill the resin-rich regions 6 (see FIG. 5), which are sources of cracking (weak point). By so doing, debris shielding is also ensured in the event of impact.

The thickness of the blade may also vary heightwise, i.e. in the direction perpendicular to the chord. This variation in thickness may be smaller or greater depending on the particular blade.

In the general case of near-prismatic blades, i.e. whose thickness does not greatly vary heightwise, the solution consists in taking advantage of a phenomenon that is known in braiding, namely that the thickness of the braids increases with the braiding angle This braiding angle depends on the production speed V, i.e. the speed in the braiding direction, but also the speed of circumferential braiding co. The production speeds $V_1, V_2, V_3, V_4$ are identical since the braids are wound around one same mandrel 3 (see FIG. 2). However, it is possible to independently control the circumferential braiding speeds $\omega_1, \omega_2, \omega_3, \omega_4$ so as to periodically vary the thickness of the braid being manufactured. The period to be considered corresponds to the height H of the braid plus the length L of the platform in the case of a blade with integrated platform as shown in FIG. 6.

In the case the thickness greatly varies heightwise, the solution lies in the use of specific tri-axial braids in which the yarns at 0° are made of elastomer yarns or heat-shrinkable yarns. In this case, the method is adapted accordingly. For this purpose, the variants of the method relating to the use of elastomer or heat-shrinkable yarns are described further on.

Step b) (not shown) of the method as in the invention consists in flattening the nested braids to form a multilayer "sock". As non-limiting example, flattening may be achieved by passing the nested braids between two rolls or by passing the nested braids over a pulley causing a change in the braiding direction.

The flattened braids are then stitched together at stitching step c). Stitching is achieved in a direction perpendicular to the braiding direction.

This step (not shown) occurs before winding on the mandrel 3 (see FIG. 2) and has a twofold role. First, it allows to join the tubular braids at a given point, and secondly, it provides reinforcement through the thickness at the level of the blade (L)/platform (H) radius 8 (see FIG. 7). The thickness of the flattened perform is at its maximum at the point of the seam where it is equivalent to about eight folds.

It should be noted that an additional stitching operation may also be performed automatically to reinforce some portions of the preform (e.g. edges, lips of future attachment holes, etc.). If aerodynamics so require, it is possible to adjust the thickness of the preform very precisely by means of a denser stitch (embroidery).

After stitching step c), the braids are wound on a transport mandrel 3, i.e. this is winding step d) (see FIG. 2). This mandrel 3 allows to draw the four tubular braids at identical speed during manufacture. It also allows transport long lengths of braid towards the cutting table for example. This is why it is called a transport mandrel.

The braids are then unwound from the mandrel and cut to the desired length at cutting step e).

The blade to be manufactured with or without integrated platform may have different geometries.

If only the blade is to be manufactured, i.e. an "I" profile, the preform may be cut at equidistance from the seam to obtain two identical blades at the same time. A third cut is then required at the level of the seam to separate the two blades.

For an "L" profile, i.e. a blade with integrated platform, the seam acts as reinforcement through the thickness of the blade/platform radius as mentioned above.

For a "C" or "Z" stator blade profile, it is possible to form two zones located either side of the blade that will then be folded at 90° relative to the latter in order to facilitate mechanical assembly (rivets, bolts, "lockbolts", etc.) of the blade to the outer and inner rings.

Description of Variants of the Method as in the Present Invention

In one variant of the method as in the invention, the yarns at 0° comprise yarns in elastomer. This variant of the method is used when the blade to be manufactured has a large variation in thickness justifying the release of folds depending on the height as mentioned previously. As non-limiting example, the method is described for two interlocked braids (see FIG. 7). The inner tubular braid 9 comprises yarns at 0° in elastomer. The outer tubular braid 10 comprises yarns at 0° in carbon fibres in the case of a tri-axial braid; it may also not comprise any yarns at 0° (case of a bi-axial braid).

In this variant of the method, the yarns at 0° in elastomer are pre-stressed (tensile force) at step a) of the braid manufacture. This may be achieved by controlling the tension in the yarns at 0°, for example using a tensioning roller system such as used in spooling devices.

After stitching step c) and winding step d), the nested braids unwound from the mandrel are laid out and clamped flat using a clamping system 7 at an additional step d').

During cutting step e), two cutting operations are performed either side of the seam 8 and the inner tubular braid 9 retracts through relaxing of the tension stresses existing in the elastomer yarns. This results in variation in the heightwise thickness of the blade preform.

It is evidently possible and even preferable to apply different pre-stress levels to the elastomer yarns at 0° so as to impart optimal geometry to the retracted braid, such as an elliptical profile (see FIG. 8) in which there is lesser retraction at mid-chord than at the levels of the leading and trailing edges of the blade perform. According to the invention, any other profile of retracted braid may also be suitable.

In another variant of the method as in the invention, the yarns at 0° are in heat-shrinkable material. This other variant of the method is also used to manufacture blade preforms having large heightwise variations in thickness. This variant of the method comprises, in addition to steps a), b), c), d) and e), an additional step f) for heating the nested braids in order to allow the retraction of the different yarns at 0°. In order to impart optimal geometry to the retracted braid, such as an elliptical profile, heating may be non-uniform and/or the yarns at 0° may have different retraction coefficients. Any profile other than an elliptical profile may also be suitable.

The preform thus manufactured using the method as in the invention and its variants is then subjected to an injection of resin, using the RTM process in order to produce the stator or rotor blade.

Advantages of the Method

The method of the invention does not require the use of a core for manufacturing the braids.

Assuming the production of 1000 engines per year for example, with four stator stages per engine and 100 blades per stage, the annual volume of production can be estimated at 400000 parts. At the rate of 200 working days, this is equivalent to producing 2000 parts per day. With the braiding method of the invention, the braiding rate is approximately 1 m/min. Since the height of a blade is about 0.1 m, it is therefore possible to produce 600 preforms per hour. The same calculation applies to rotor stages.

The method as in the invention is automatic, which ensures high reproducibility and reduced labour costs. Indeed, labour-related costs represent 60-80% of the total costs for most aeronautics composite parts [Triaxial braiding: http://www.fiberinnovations.com/PDFs/Triaxial%20Braiding.pdf].

The risk of delamination is negligible.

Stiffness and torsional strength are very good due to the integrity of the tubular braids and to the helical positioning of the yarns.

The method as in the invention allows extensive flexibility for variations in parameters linked to the braiding method, such as the percentage of fibres at 0°, the braiding angle, etc.

The technique described herein has a negligible waste rate, whereas waste with the draping technique is significant.

Bi-axial braids have good conformability; they can be folded so as to form a horizontal platform and a vertical blade, the latter having a leading edge angle of ~15° relative to the axis of the booster.

Unlike the machines generally used for aeronautic composites, the investment cost of a braiding machine is relatively low (http://www.fiberinnovations.com/PDFs/Triaxial%20Braiding.pdf).

The method of the invention could also be used to manufacture stators entirely made of carbon/epoxy. Indeed, blades with a "C" profile 11 can be produced so as to allow the interlocking of the different stator blades with two platforms such as illustrated in FIG. 9. The interlocking of the upper platforms will then form an outer ring with double skin, while the interlocking of the lower platforms will form an inner ring with double skin.

The invention claimed is:

1. Automatic method for manufacturing a stator or rotor blade preform for a turbine engine, comprising at least the following successive steps:
   a) a step for the helical braiding of a plurality of tubular braids (1) interlocking into one another, called nested braids, said step being conducted on braiding machines (2) placed in a row in a braiding direction;
   b) a step for flattening the nested braids (1);
   c) a step for stitching the nested braids (1) together in a direction perpendicular to the braiding direction;
   d) a step for winding the nested braids (1) on a transport mandrel (3);
   e) a step for cutting the nested braids (1) unwound from the transport mandrel (3), said cut being performed in a direction perpendicular to the braiding direction.

2. Method as in claim 1, wherein at step a), yarns at 0° (4), i.e. parallel to the braiding direction, are inserted on at least a portion of the perimeter of one or several tubular braids during the manufacture of the braid(s).

3. Method as in claim 2, wherein the inserted yarns or strands have different diameters.

4. Method as in claim 1, wherein at step a), at least one yarn 0° (4) or strand at 0°, i.e. parallel to the braiding direction, is inserted between the tubular braids (1).

5. Method as in claim 1, wherein the tubular braids (1) are arranged non-concentrically at step a).

6. Method as in claim 1, wherein the circumferential braiding speed is adjusted during the manufacture of the tubular braids (1) so as to periodically vary the thickness of the braids.

7. Method as in claim 1, wherein at least one of the tubular braids comprises yarns at 0° (4) in elastomer material or heat-shrinkable material.

8. Method as in claim 7, wherein the yarns at 0° (4) in elastomer material are pre-stressed at step a).

9. Method as in claim 8, wherein after winding step d), the tubular braids (1) unwound from the mandrel (3) are laid out and clamped at an additional step d'), and wherein after cutting step e), the tubular braid(s) comprising elastomer yarns retract(s).

10. Method as in claim 8, wherein the yarns are pre-stressed with different tension levels.

11. Method as in claim 7, wherein the yarns are heat-shrinkable, and wherein said method comprises an additional step f) for heating the nested braids, said step f) occurring after cutting step e).

12. Method as in claim 11, wherein the applied heating is not uniform and/or wherein the heat-shrinkable yarns have different retraction coefficients.

13. Method as in claim 1, comprising, after the preform is produced, an additional step for injecting resin into the preform using the RTM process (Resin Transfer Moulding).

14. Stator or rotor blade for turbine engine obtained by means of the method as in claim 1, said blade comprising nested braids (1) stitched together.

15. Stator or rotor blade for turbine engine as in claim 14, having a variable thickness depending on its chord and/or its height.

* * * * *